(12) United States Patent
Depraete

(10) Patent No.: US 10,274,081 B2
(45) Date of Patent: Apr. 30, 2019

(54) STATOR ASSEMBLY OF HYDRAUKINETIC TORQUE CONVERTER WITH PIVOTABLE STATOR BLADES, AND METHOD FOR MAKING THE SAME

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 77 days.

(21) Appl. No.: 15/476,378

(22) Filed: Mar. 31, 2017

(65) Prior Publication Data

US 2018/0283547 A1  Oct. 4, 2018

(51) Int. Cl.
| | |
|---|---|
| *F16H 61/56* | (2006.01) |
| *F16H 41/28* | (2006.01) |
| *F16H 41/24* | (2006.01) |
| *F16H 45/02* | (2006.01) |

(52) U.S. Cl.
CPC ............ *F16H 61/56* (2013.01); *F16H 41/28* (2013.01); *F16H 45/02* (2013.01); *F16H 2041/246* (2013.01); *F16H 2041/285* (2013.01)

(58) Field of Classification Search
CPC .......................... F16H 2041/285; F16H 61/56
See application file for complete search history.

(56) References Cited

U.S. PATENT DOCUMENTS

| | | | |
|---|---|---|---|
| 2,944,402 A | 7/1960 | Russell | |
| 3,398,532 A * | 8/1968 | Egbert | F16H 61/56 60/354 |
| 3,852,955 A | 12/1974 | Wonn et al. | |
| 5,307,629 A * | 5/1994 | By | F16H 41/26 60/342 |
| 8,820,062 B2 | 9/2014 | Lecocq | |
| 9,523,420 B2 | 12/2016 | Depraete | |
| 9,541,181 B2 | 1/2017 | Depraete | |
| 9,562,598 B2 | 2/2017 | Depraete et al. | |
| 9,599,206 B2 | 3/2017 | Depraete | |
| 2015/0337933 A1 | 11/2015 | Arhab et al. | |
| 2016/0116041 A1 | 4/2016 | Depraete | |
| 2016/0160971 A1 | 6/2016 | Depraete et al. | |
| 2016/0160975 A1 | 6/2016 | Depraete et al. | |
| 2016/0305523 A1 | 10/2016 | Depraete | |
| 2016/0327141 A1 | 11/2016 | Depraete | |

* cited by examiner

*Primary Examiner* — F Daniel Lopez
(74) *Attorney, Agent, or Firm* — Berenato & White, LLC

(57) ABSTRACT

A stator assembly of a hydrokinetic torque converter includes a stator rotatable about an axis and having a radially outer stator belt, an annular stator hub disposed radially within the radially outer stator belt, at least one fixed post extending radially outwardly between the stator hub and the stator belt and fixed thereto so as to non-moveably secure the stator belt to the stator hub, and a plurality of pivotable stator blades extending radially outwardly between the stator hub and the stator belt and configured to pivot relative to both the stator hub and the stator belt in the direction orthogonal to the rotational axis.

18 Claims, 25 Drawing Sheets

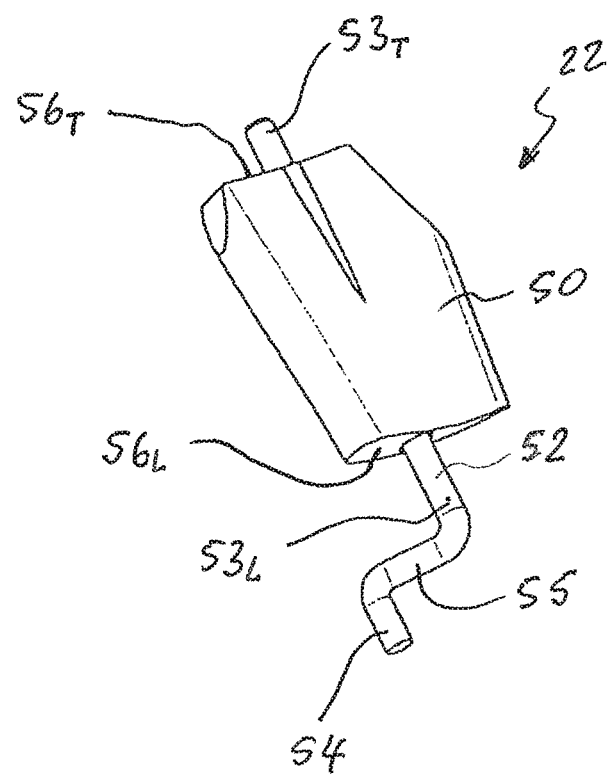

STATOR ASSEMBLY OF HYDRAUKINETIC TORQUE CONVERTER WITH PIVOTABLE STATOR BLADES, AND METHOD FOR MAKING THE SAME

FIELD OF THE INVENTION

This invention generally relates to hydrokinetic torque converters, and more particularly to a stator assembly for a variable capacity hydrokinetic torque converter with pivotable stator blades.

BACKGROUND OF THE INVENTION

Typically, a hydrokinetic torque converter includes a drive pump (or impeller wheel), a driven turbine (or turbine wheel), a stator (or reactor) fixed to a case of the torque converter, and a one-way clutch for restricting a rotational direction of the stator to one direction. The turbine is integral or operatively connected with a hub linked in rotation to a driven shaft, which is itself linked to an input shaft of a transmission of a vehicle. The turbine wheel works together with the impeller wheel, which is linked in rotation to a casing that is linked in rotation to a driving shaft driven by an internal combustion engine. The stator is interposed axially between the turbine wheel and the impeller wheel, and is mounted on a stationary shaft with the interposition of the one-way clutch. The stator alters oil flow returning from the turbine wheel to the impeller wheel and provides torque multiplication. The stator is mounted on the one-way clutch, which prevents the stator from counter-rotating with respect to the prime mover but allows forward rotation.

While stator assemblies for hydrokinetic torque converters, including but not limited to that discussed above, have proven to be acceptable for vehicular driveline applications and conditions, improvements that may enhance their performance and cost are possible.

BRIEF SUMMARY OF THE INVENTION

According to a first aspect of the invention, a stator assembly for a hydrokinetic torque converter includes a stator rotatable about a rotational axis. The stator comprises a radially outer stator belt, an annular stator hub disposed radially within the radially outer stator belt, at least one fixed post extending radially outwardly between the stator hub and the stator belt and fixed thereto so as to non-moveably secure the stator belt to the stator hub, and a plurality of pivotable stator blades extending radially outwardly between the stator hub and the stator belt and configured to pivot relative to both the stator hub and the stator belt in a direction orthogonal to the rotational axis.

According to a second aspect of the present invention, a hydrokinetic torque converter comprises an impeller wheel rotatable about a rotational axis, a turbine wheel coaxially aligned with and hydrodynamically drivable by the impeller wheel, and a stator assembly situated between the impeller wheel and the turbine wheel. The stator assembly comprises a stator rotatable about the rotational axis. The stator includes a radially outer stator belt, an annular stator hub disposed radially within the radially outer stator belt, at least one fixed post extending radially outwardly between the stator hub and the stator belt and fixed thereto so as to non-moveably secure the stator belt to the stator hub, and a plurality of pivotable stator blades extending radially outwardly between the stator hub and the stator belt and configured to pivot relative to both the stator hub and the stator belt in the direction orthogonal to the rotational axis.

According to a third aspect of the present invention, there is provided a method for making a stator assembly of a hydrokinetic torque converter. The method involves the steps of manufacturing a stator member including an annular stator hub, an radially outer stator belt, and at least one fixed post extending radially outwardly between the stator hub and the stator belt and fixed thereto so as to non-moveably secure the stator belt to the stator hub, providing a plurality of pivotable stator blades, and rotatably mounting the pivotable stator blades to the stator member.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 17 is a perspective view of a rotatable stator blade of the stator assembly in accordance with the exemplary embodiment of the present invention;

Figure 1:
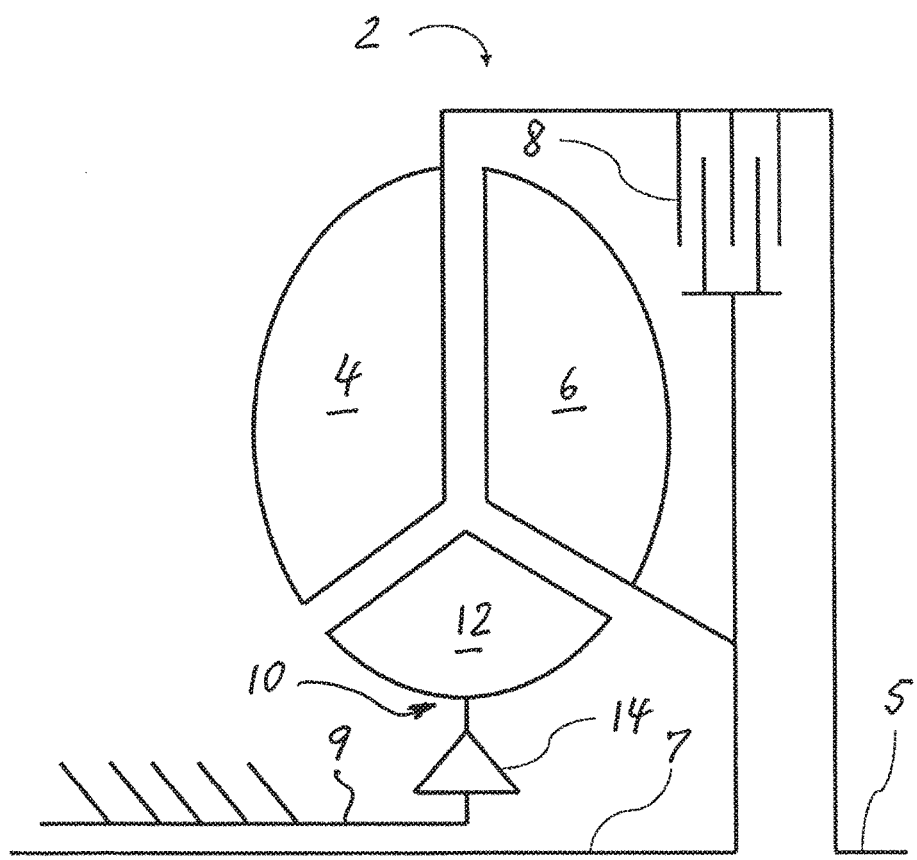
FIG. 1 is a schematic view of a hydrokinetic torque converter.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

FIG. 1 schematically illustrates a hydrokinetic torque converter 2. The torque converter 2 provides two parallel power flow paths from an input shaft 5 to an output shaft 7. A hydrodynamic power flow path includes an impeller wheel 4 and a turbine wheel 6. The impeller wheel 4 is fixedly coupled to the input shaft 5 that is coupled to an output shaft of a prime mover, such as an engine crankshaft. The turbine wheel 6 is fixedly coupled to the output shaft 7. A stator 12 is non-rotatably coupled to a stationary stator shaft 9 through a one-way (or overrunning) clutch 14. At low turbine shaft speeds, the impeller wheel 4 causes fluid to flow from the impeller wheel 4 to the turbine wheel 6 through the stator 12 and back to the impeller wheel 4, providing a first power flow path. The stator 12 is held against rotation by the one-way clutch 14 such that it can redirect the fluid flow and provide a reaction torque for torque multiplication. As the speed of the turbine wheel 6 approaches the speed of the impeller wheel 4, the input shaft 5 is selectively coupled to the output shaft 7 by a lockup clutch 8 providing a second power flow path.

Figure 2:
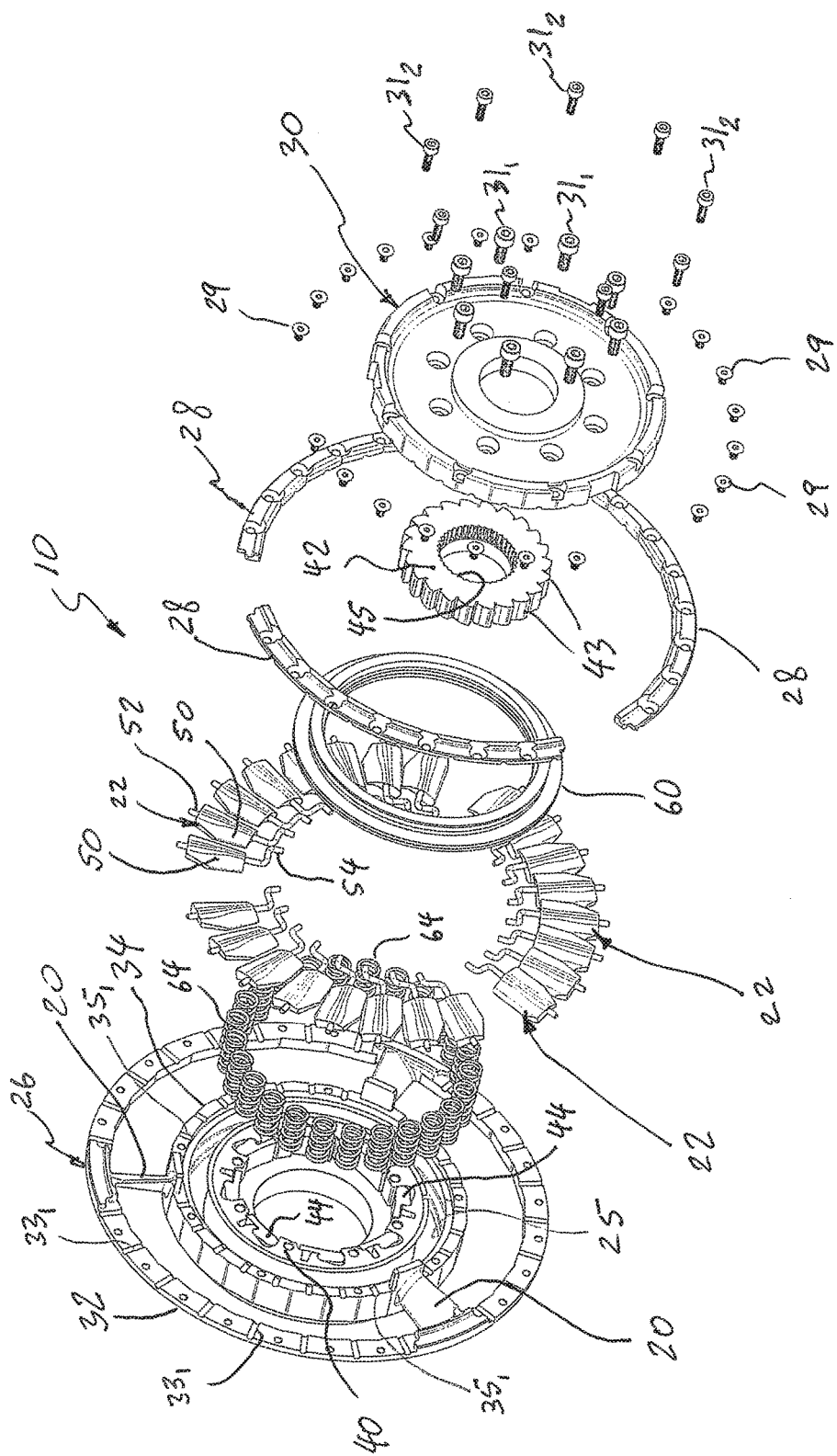
FIG. 2 is a partial exploded view of a stator assembly in accordance with an exemplary embodiment of the present invention.
Figure 3A:
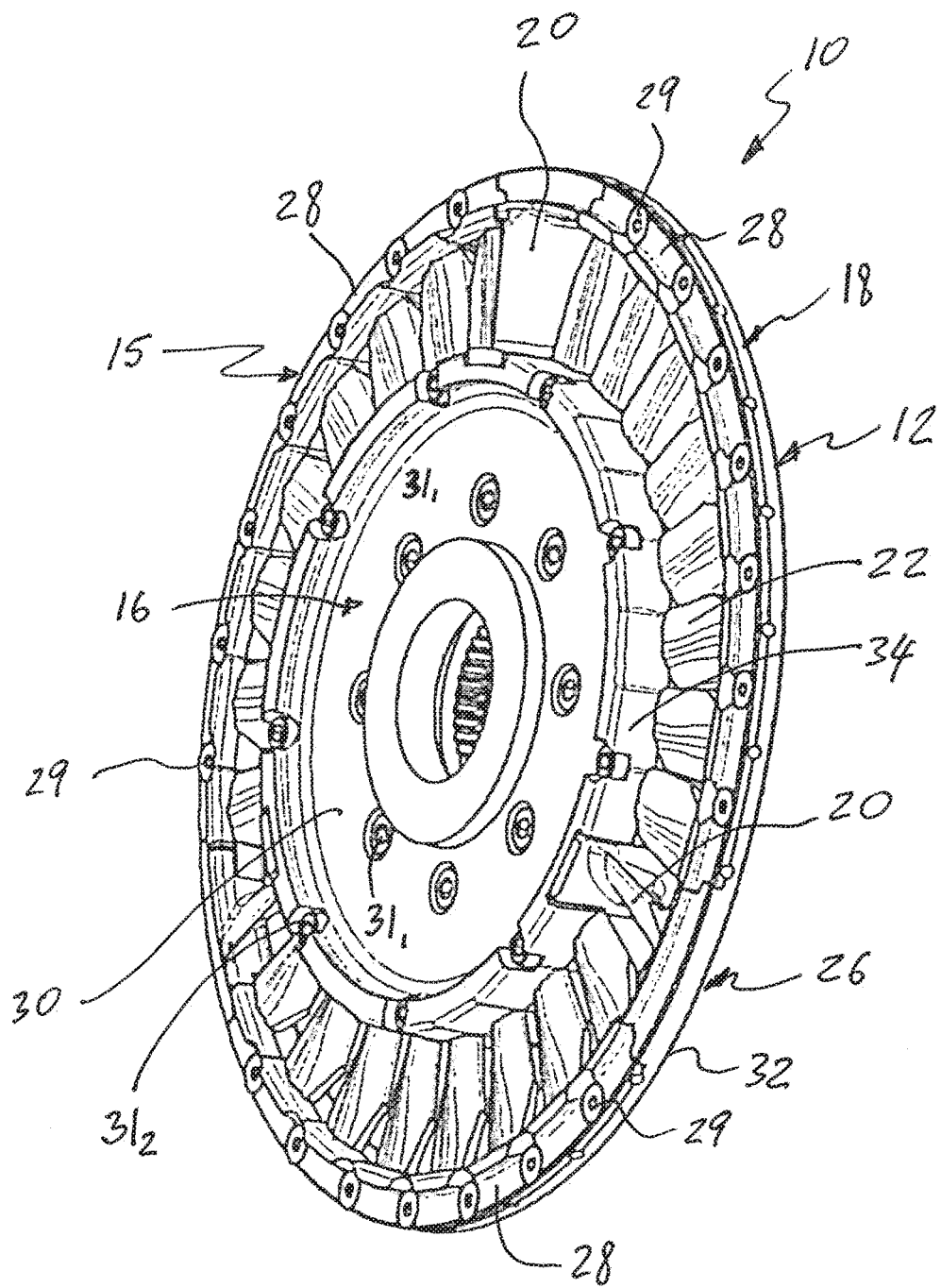
FIG. 3A is a perspective view of the stator assembly in accordance with the exemplary embodiment of the present invention.
Figure 4:
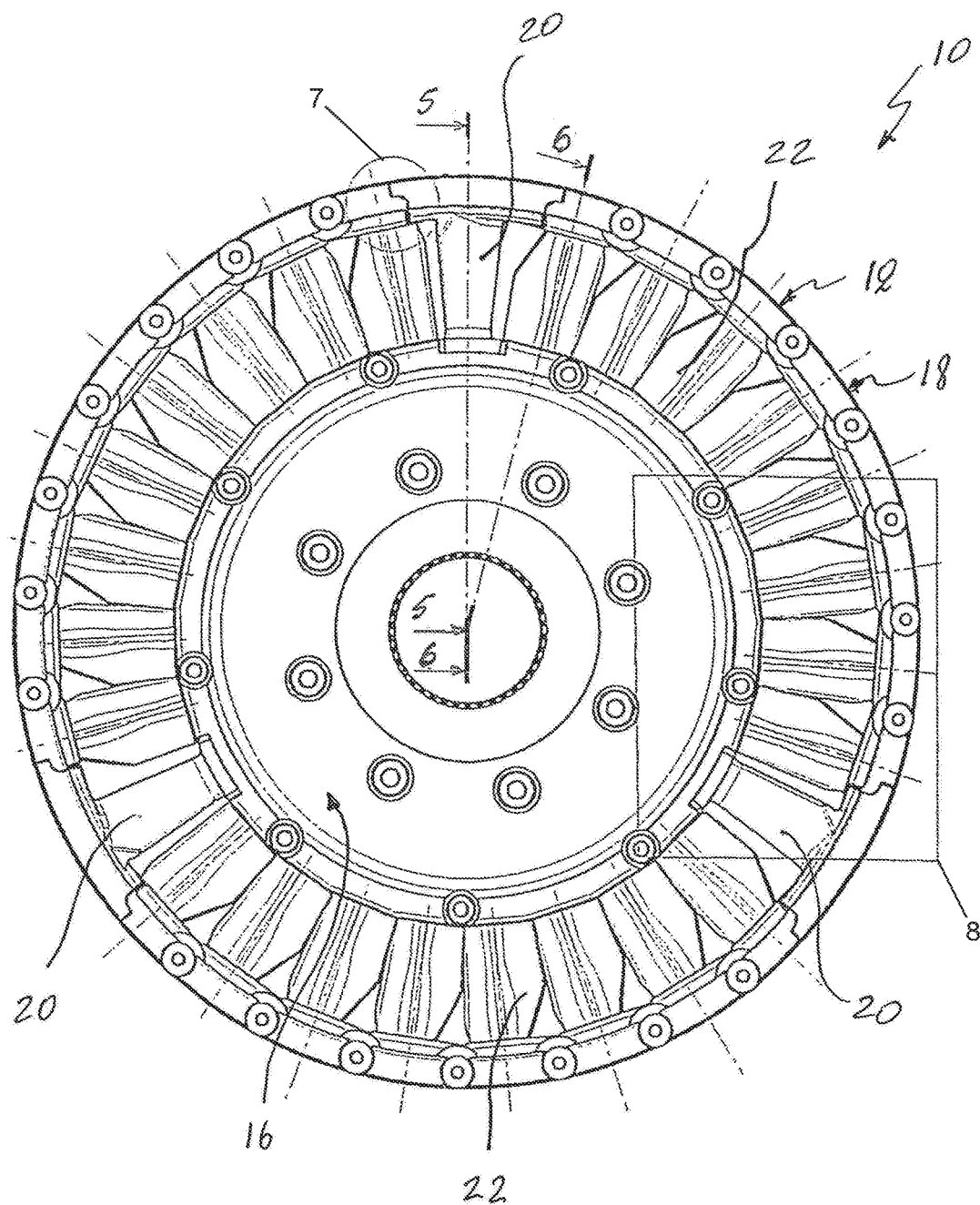
FIG. 4 is a front plan view of the stator assembly in accordance with the exemplary embodiment of the present invention.

A stator assembly suitable for use in the hydrokinetic torque converter 2 is generally represented in the accompanying drawings by reference numeral 10, as best shown in FIGS. 2, 3A and 4. The stator assembly 10 is rotatable about a rotational axis X and comprises the stator (or reactor) 12 and the one-way (or overrunning) clutch 14 disposed between the stator 12 and the stator shaft 9. The stator assembly 10 is typically disposed between the impeller wheel 4 and the turbine wheel 6 of the torque converter 2, as best shown in FIG. 1. The stator assembly 10 is positioned between the impeller wheel 4 and the turbine wheel 6 of the hydrokinetic torque converter 2 to redirect fluid from the turbine wheel 6 back to the impeller wheel 4 in an efficient manner, as shown in FIG. 1. The one-way clutch 14 permits rotation of the stator 12 in one direction only. In other words, the stator 12 is typically mounted to the one-way clutch 14 to prevent the stator 12 from counter-rotating.

The stator 12, according to the exemplary embodiment of the present invention best illustrated in FIGS. 2, 3A, 3B and 15-18B, comprises a stator member 15 and a plurality of pivotable (or rotatable) stator blades (or vanes) 22 rotatably mounted to the stator member 15. In turn, the stator member 15 includes an annular stator hub 16 housing the one-way clutch 14, an annular radially outer rim (or stator belt) 18, and at least one, and preferably three (3) fixed posts 20. The stator hub 16 defines a substantially annular, cylindrical central stator hub bore 24 coaxial to the rotational axis X and housing the one-way clutch 14. Each of the fixed posts 20 extends radially outwardly between the stator hub 16 and the outer rim 18 and is non-movably secured (i.e., fixed) thereto so as to non-moveably mount the outer rim 18 to the stator hub 16. Each of the pivotable stator blades 22 extends radially outwardly between the stator hub 16 and the outer rim 18 and is configured to pivot relative to both the stator hub 16 and the outer rim 18 in the direction orthogonal to the rotational axis X. According to the exemplary embodiment of the present invention, each of the fixed posts 20 of the stator 12 is in the form of a fixed stator blade.

Figure 15:
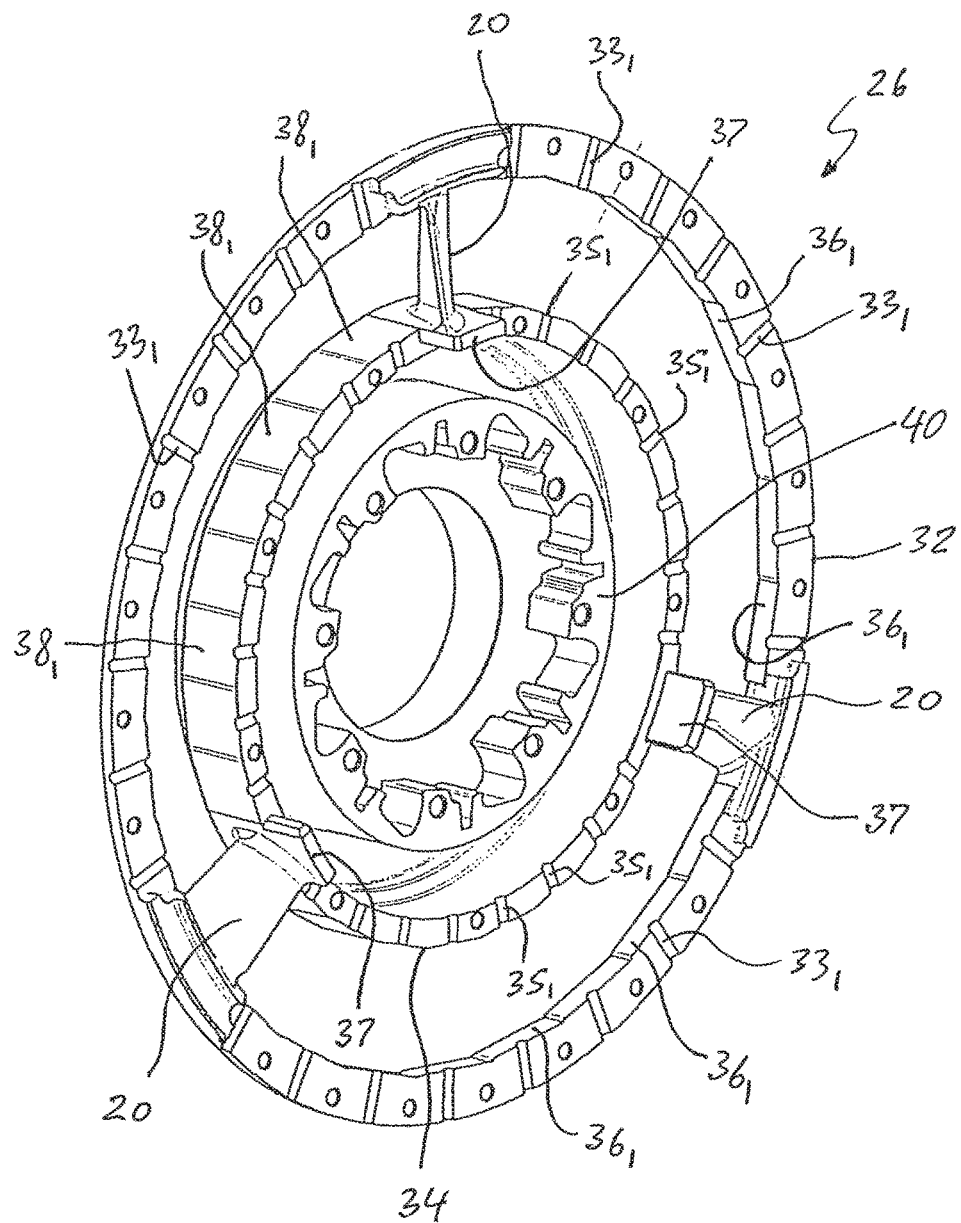
FIG. 15 is a perspective view of a stator body of the stator assembly in accordance with the exemplary embodiment of the present invention.
Figure 16:
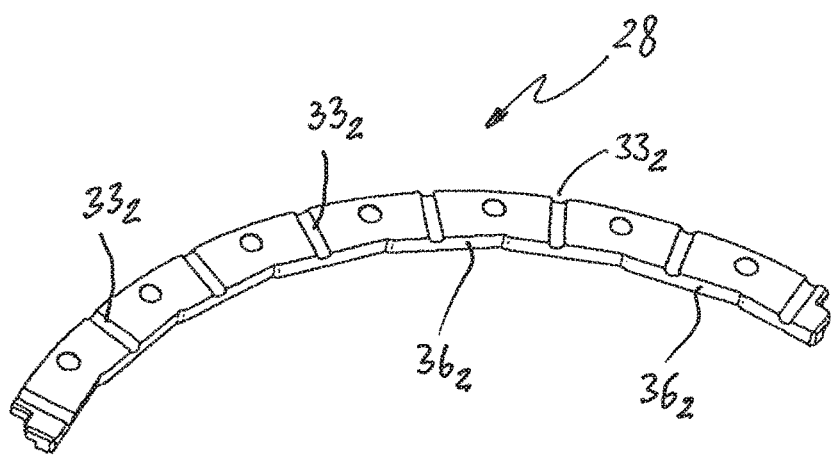
FIG. 16 is a perspective view of an outer rim part of the stator assembly in accordance with the exemplary embodiment of the present invention.
Figure 18A:
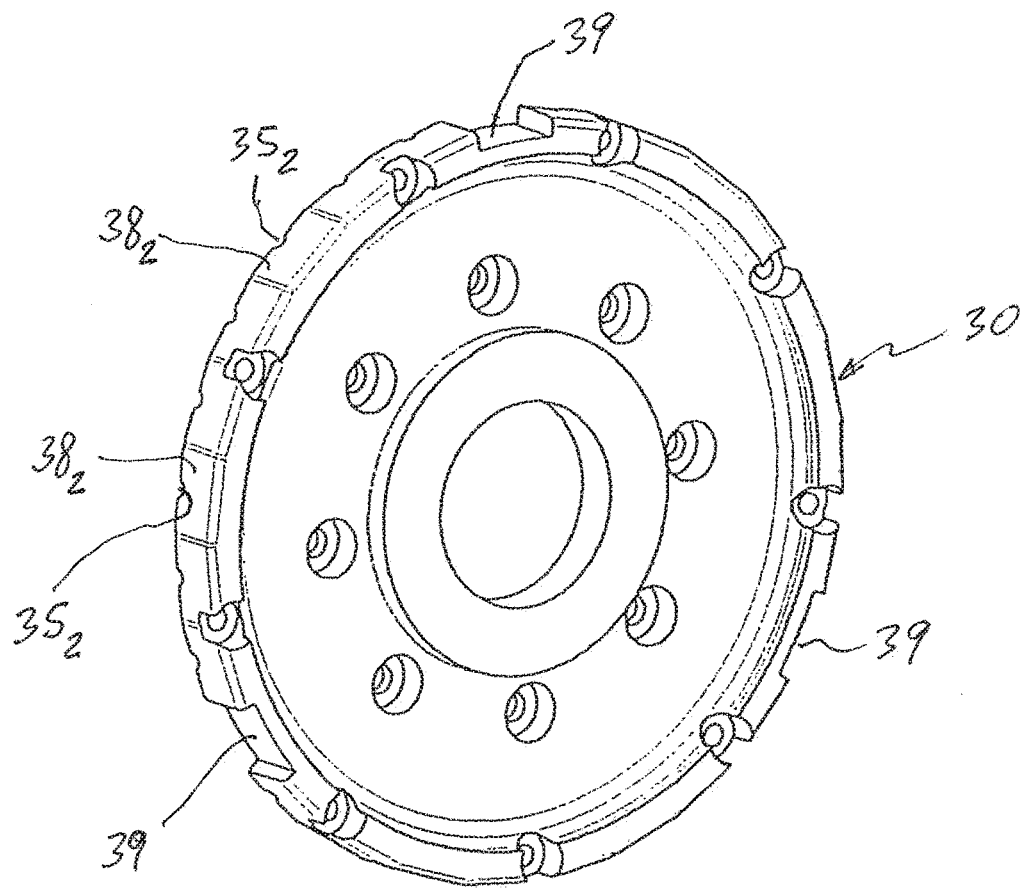
FIG. 18A is a front perspective view of the stator hub cover of the stator assembly in accordance with the exemplary embodiment of the present invention.
Figure 18B:
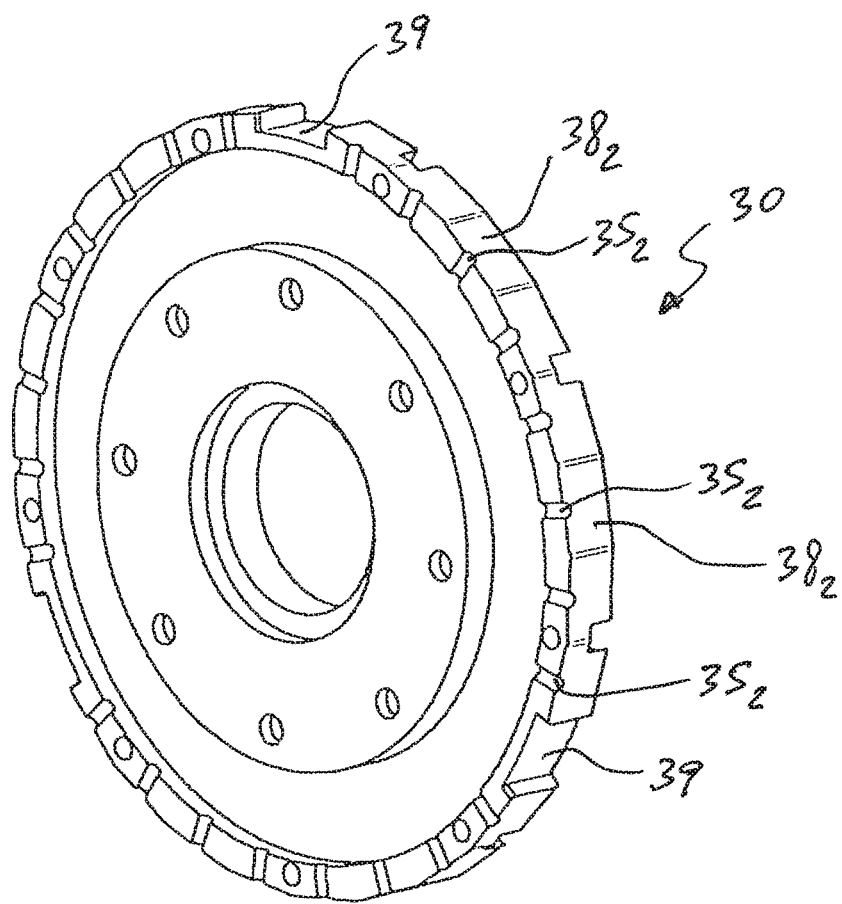
FIG. 18B is a rear perspective view of the stator hub cover of the stator assembly in accordance with the exemplary embodiment of the present invention.

As best shown in FIGS. 2, 10-14, 18A and 18B, the stator 12 includes a stator body 26, one or more of outer rim parts 28, and a stator hub cover 30. The stator body 26 includes an annular radially outer rim (or belt) portion 32, an annular stator hub portion 34 radially spaced from and disposed within the outer rim portion 32, and the at least one fixed post 20 radially outwardly extending from the stator hub portion 34 to the outer rim portion 32 so as to non-moveably mount the outer rim portion 32 to the stator hub portion 34. According to the exemplary embodiment of the present invention, the stator body 26 with the outer rim portion 32, the stator hub portion 34 and the at least one fixed post 20 is an integral (or unitary) component, e.g., made of a single part by molding or press-forming, as best shown in FIG. 15, but may be separate components fixedly connected together.

Figure 5:
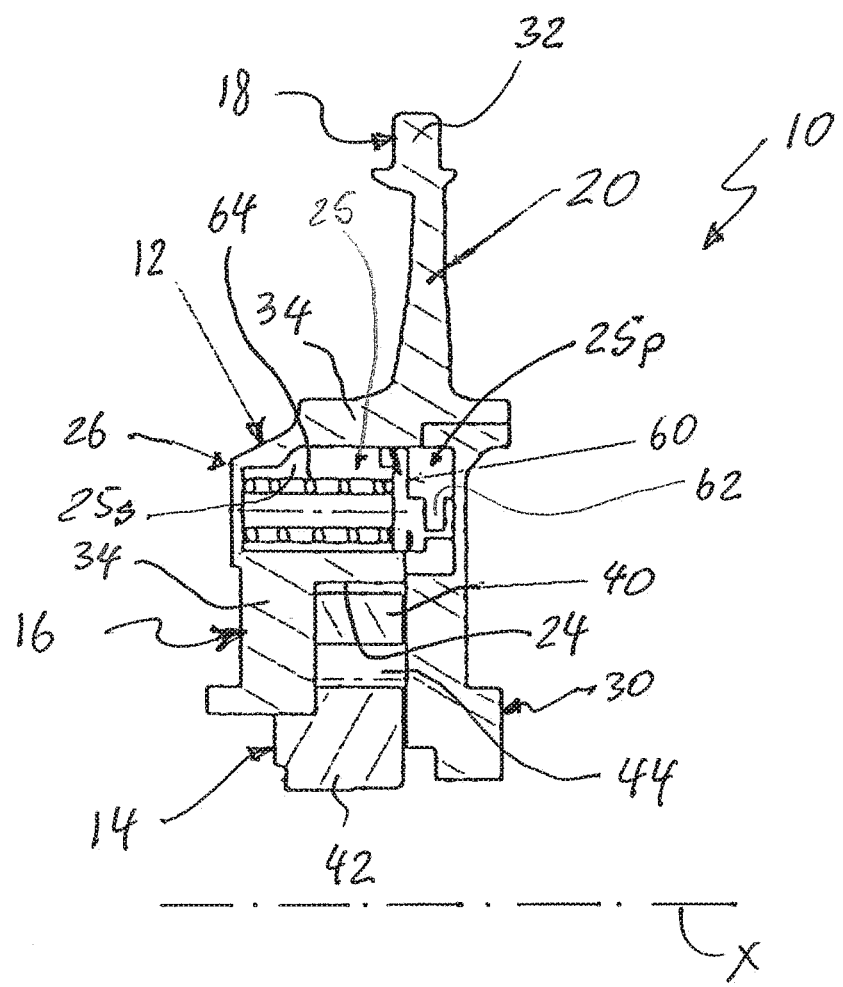
FIG. 5 is a partial sectional front view of the stator assembly taken along the line 5-5 in FIG. 4.
Figure 20:
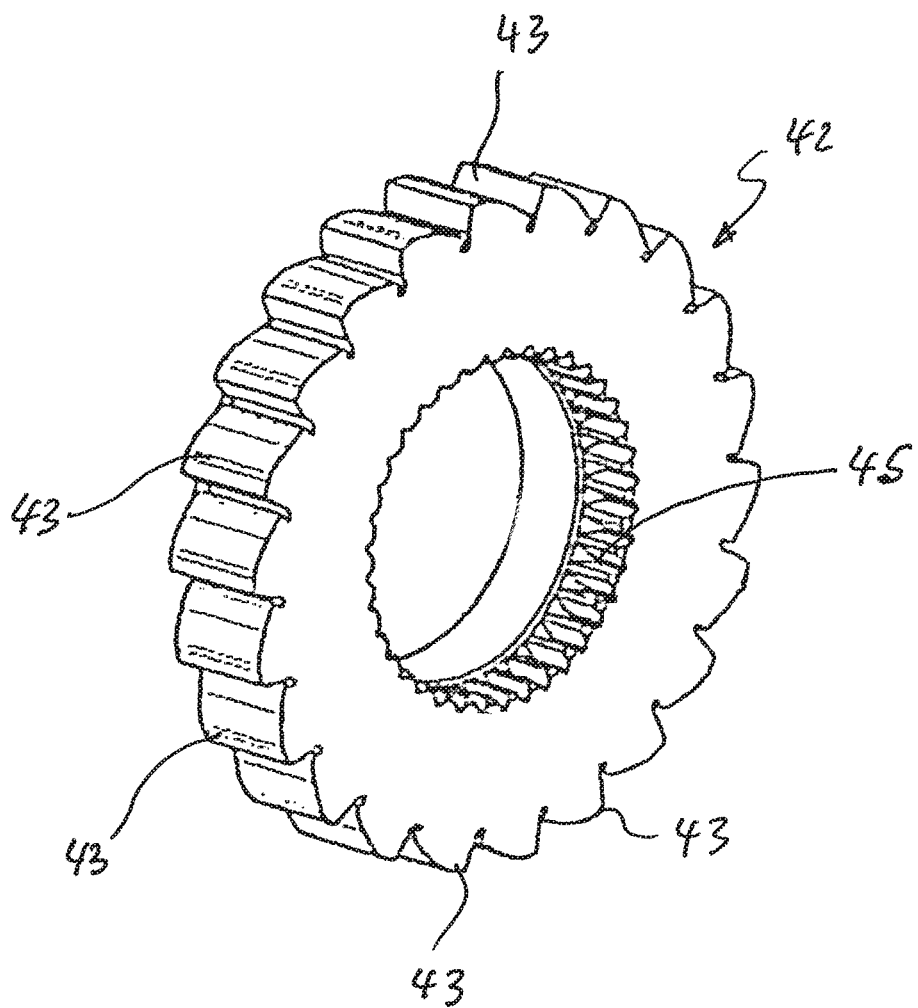
FIG. 20 is perspective view of an inner ring of the one-way clutch of the stator assembly in accordance with the exemplary embodiment of the present invention.

The one-way clutch 14 is disposed substantially in the central stator hub bore 24 in the stator 12 coaxially to the rotational axis X. Specifically, the one-way clutch 14, as best shown in FIGS. 2, 5 and 20, includes an outer ring 40 mounted within the central stator hub bore 24 coaxially with the rotational axis X, an inner ring 42 coaxial to the rotational axis X, and a plurality of sprags or rockers 44 circumferentially disposed in an annular space defined between the outer ring 40 and the inner ring 42. The rockers 44 are rotatable with the hub portion 34 and engage radially outer teeth 43 of the inner ring 42 to permit rotation of the stator 12 in one direction and to prevent rotation of the stator 12 in another direction. The one-way clutch 14 is supported by the stator 12 to rotate with respect to a stationary shaft (not shown) of the stator assembly 10. The stationary shaft is adapted to be fixed to a front support of a transmission. An inner peripheral surface of the inner ring 42 of the one-way clutch 14 has splines 45 for non-rotatably coupling to a radially outer periphery of the stator shaft 9. In other words, the inner ring 42 is splined to the stationary stator shaft 9.

The outer ring 40 of the one-way clutch 14 is mounted within the central stator hub bore 24 so as to non-rotatably engage an inner surface of the stator hub portion 34 of the stator body 26. The outer ring 40 can be toothed externally and force-fit onto the inner surface of the stator hub portion 34 so as to non-rotatably secure the outer ring 40 of the one-way clutch 14 to the stator hub portion 34 of the stator body 26. Other types of one-way clutches may be employed.

The stator hub cover 30 is non-moveably (i.e., fixedly) attached to the stator hub portion 34 of the stator body 26. The stator hub cover 30 retains the one-way clutch 14 in the central stator hub bore 24 of the stator hub portion 34 of the stator body 26 and prevents axial movement of the components of the one-way clutch 14 in the direction of the rotational axis X relative to the stator hub portion 34. Specifically, the stator body 26 further includes at least one, and preferably three guide protrusions 37 axially extending toward the stator hub cover 30, while the stator hub cover 30 includes at least one, and preferably three axially extending guide channels 39, each guide channel 39 being complementary to one of the guide protrusions 37 of the stator body 26. In an assembled condition of the stator 12, each of the guide protrusions 37 of the stator body 26 is disposed in one of the complementary guide channels 39 of the stator hub cover 30. In other words, the stator hub cover 30 is mounted to the stator hub portion 34 of the stator body 26 by the guide protrusions 37 of the stator body 26 and the complementary guide channels 39 of the stator hub cover 30. Moreover, the stator hub cover 30 is non-moveably (i.e., fixedly) attached to the stator hub portion 34 of the stator body 26 by threaded fasteners $31_1$ and $31_2$, best shown in FIGS. 2, 3A and 3B.

Each of the pivotable stator blades 22 of the stator 12, as best shown in FIGS. 8, 9, 14 and 17, includes a rotatable blade body 50 non-rotatably secured to a respective pivot shaft 52, which extends through the stator hub portion 34 of the stator body 26 and the stator hub cover 30. In other words, the pivot shafts 52 of the pivotable stator blades 22 are rotatably supported by the stator hub 16 and the stator belt 18 of the stator 12, as best shown in FIGS. 8, 9, 11 and 14. Each pivot shaft 52 projects into an annular actuator bore 25 of the stator hub 16 disposed radially outside the central stator hub bore 24. Each pivot shaft 52 is provided with a crank pin 54 at a radially inner end of the associated pivot shaft 52.

The radially outer rim 18 comprises the outer rim portion 32 of the stator body 26 and the outer rim parts 28, each non-moveably secured to the outer rim portion 32 by fasteners 29, e.g., threaded fasteners, such as screws or bolts, as best shown in FIGS. 2, 3A, 3B and 7, or rivets. Moreover, the outer rim portion 32 and each of the outer rim parts 28 has cooperating radially extending, semi-cylindrical grooves $33_1$ and $33_2$, respectively, forming together radial, cylindrical upper bearing apertures 33 in which the pivot shafts 52 of the rotatable stator blades 22 are journaled. Specifically, radially outer ends $53_T$ of the pivot shafts 52 at least partially extend through the radially outer rim 18 of the stator 12 so as to engage the upper bearing apertures 33 therein, formed by the cooperating radial grooves $33_1$ and $33_2$ in the outer rim portion 32 and the outer rim parts 28, respectively.

Moreover, the stator belt 18 has a polygonal radially inner surface between the fixed posts 20 of the stator 12. The polygonal radially inner surface of the stator belt 18 includes a plurality of adjacent planar (i.e., plane or flat) radially inner surfaces 36 each facing one of the pivotable stator blades 22. The outer rim portion 32 of the stator body 26 has a plurality of adjacent planar (i.e., plane or flat) surfaces $36_1$ each facing one of the pivotable stator blades 22, while the outer rim parts 28 have a plurality of adjacent planar (i.e., plane or flat) surfaces $36_2$ each facing one of the pivotable stator blades 22 and cooperating with one of the planar surfaces $36_1$ of the outer rim portion 32 of the stator body 26. In an assembled condition of the stator 12, when the outer rim portion 32 of the stator body 26 and the outer rim parts 28 are axially juxtaposed, each of the axially adjacent pairs of the planar surfaces $36_1$ and $36_2$ together define one of the planar surfaces 36 of the stator belt 18.

Figure 3B:
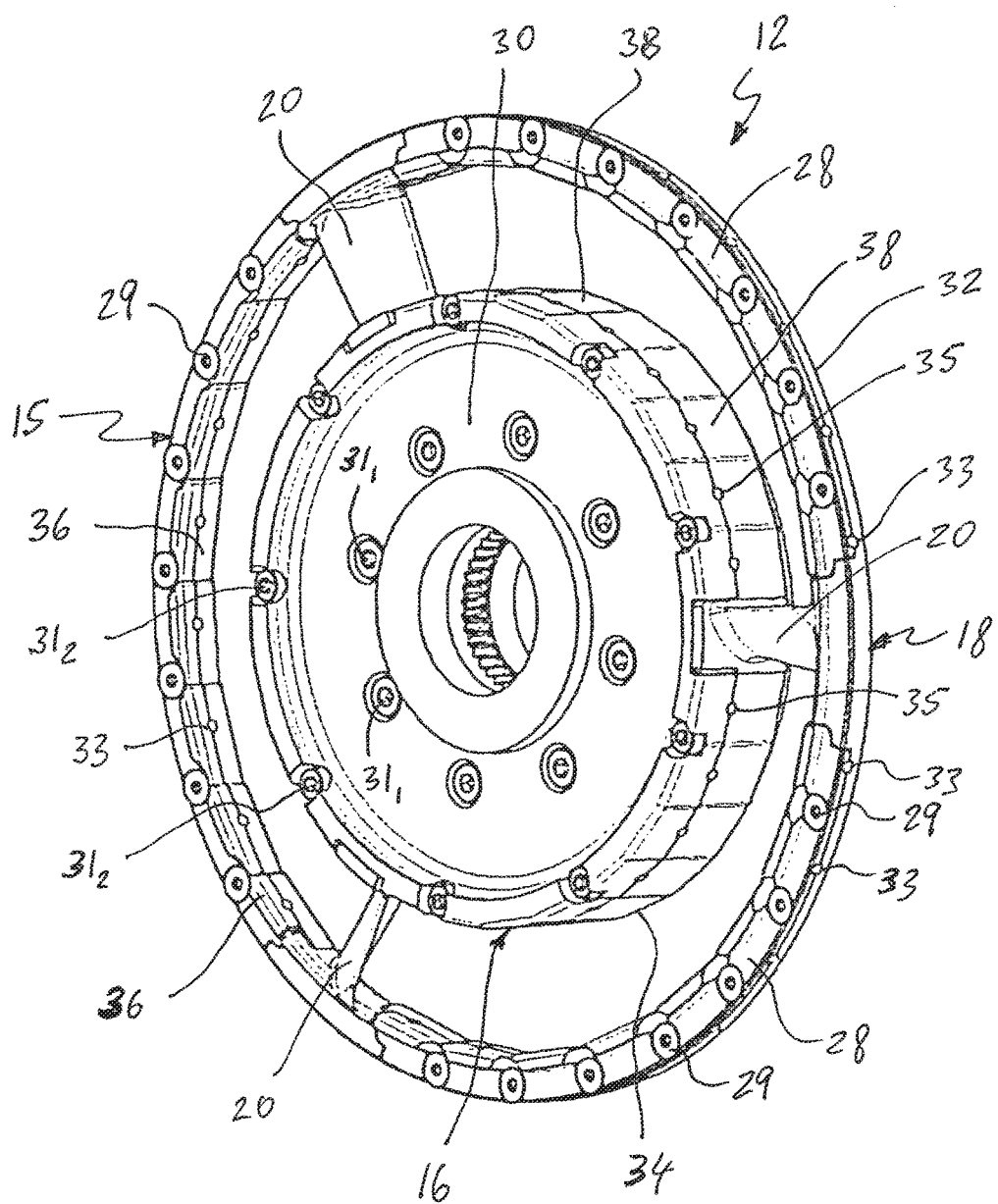
FIG. 3B is a perspective view of the stator assembly in accordance with the exemplary embodiment of the present invention without pivotable stator blades.
Figure 8:
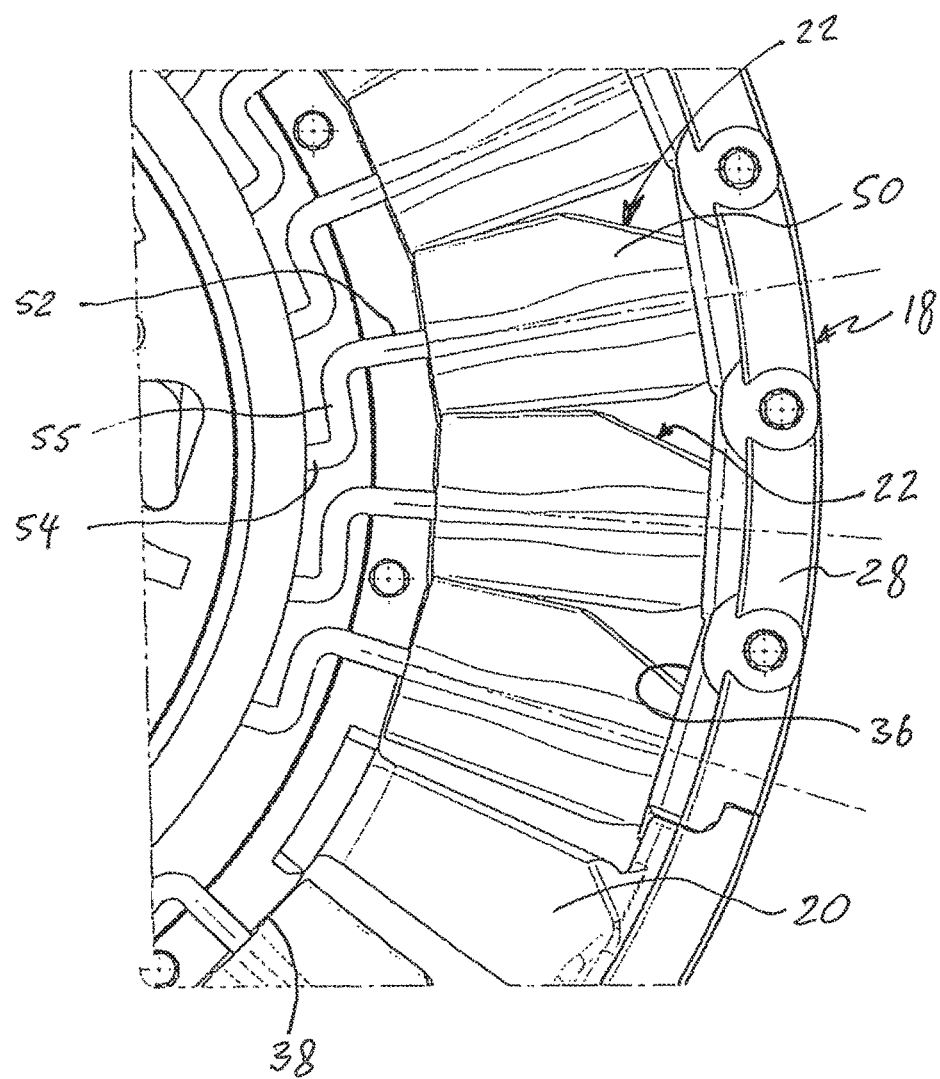
FIG. 8 is an enlarged view of a fragment of the stator assembly shown in the rectangle "8" in FIG. 4.
Figure 9:
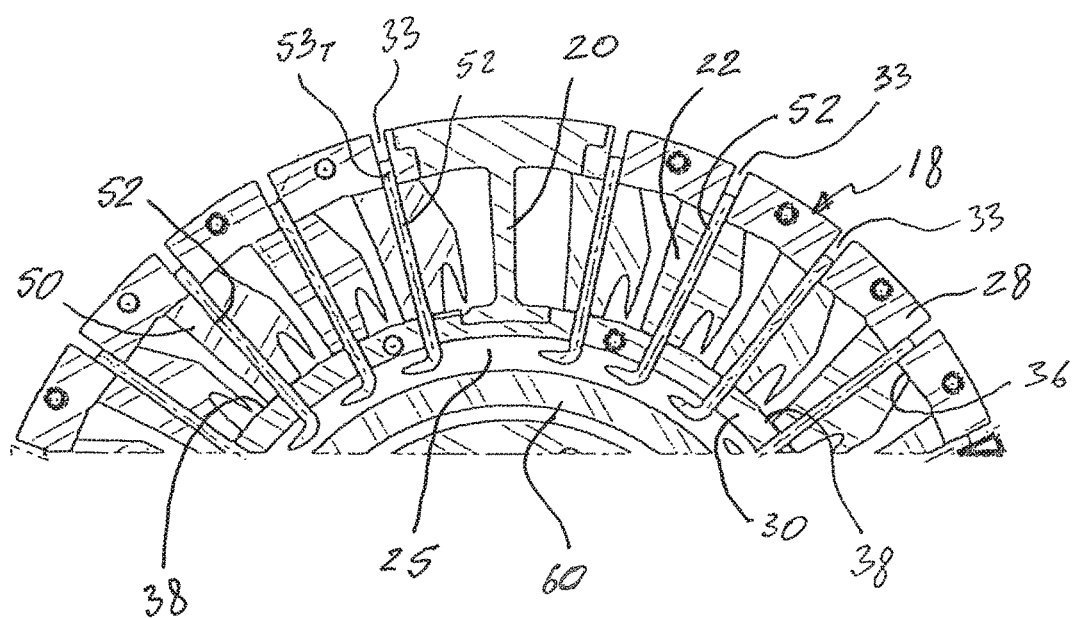
FIG. 9 is a partial sectional front view of the stator assembly taken along the line 9-9 in FIG. 6.
Figure 10:
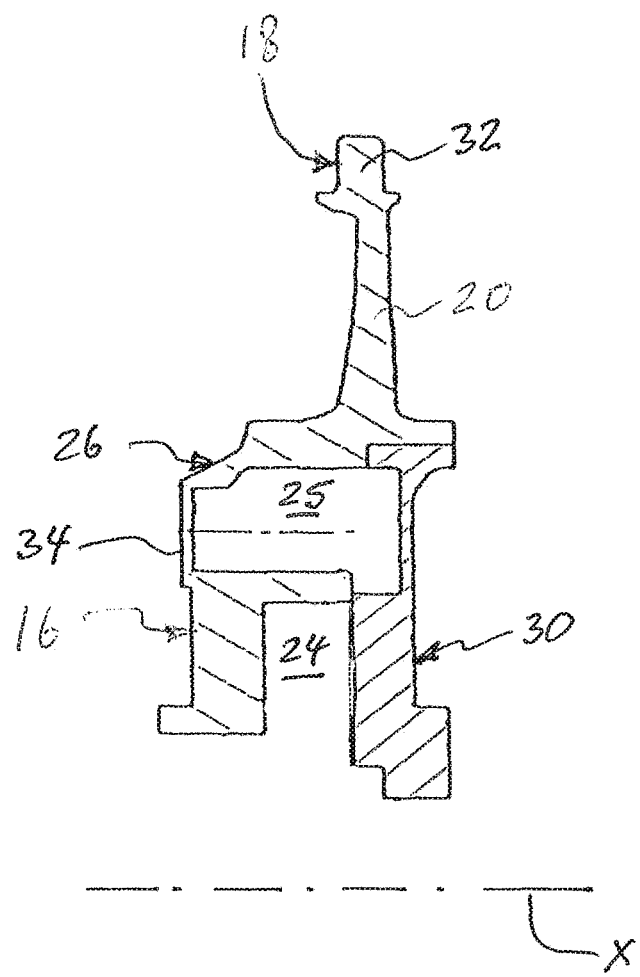
FIG. 10 is a partial sectional front view of a stator assembly taken along the line 5-5 in FIG. 4, without a one-way clutch, an annular actuating piston and resilient elastic members.
Figure 11:
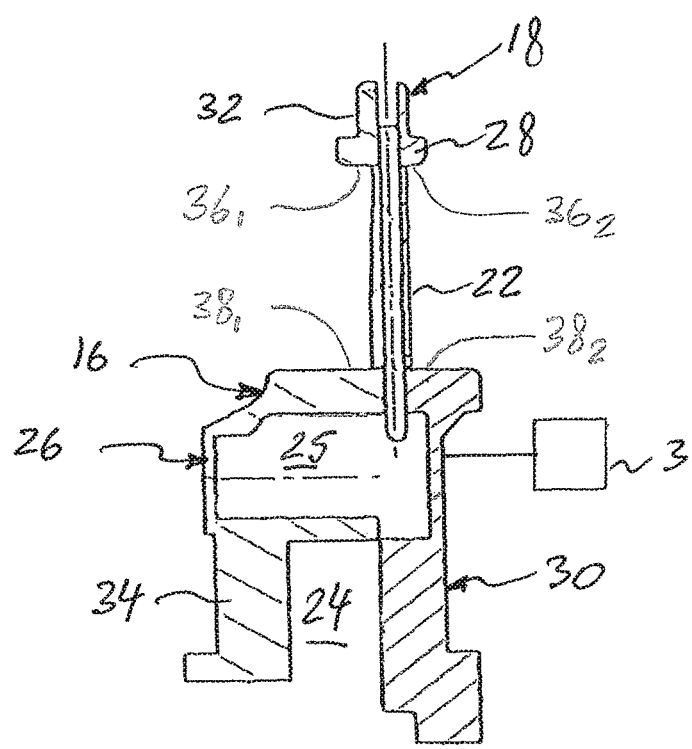
FIG. 11 is a partial sectional front view of the stator assembly taken along the line 6-6 in FIG. 4, without the one-way clutch, the annular actuating piston and the resilient elastic members.
Figure 12:
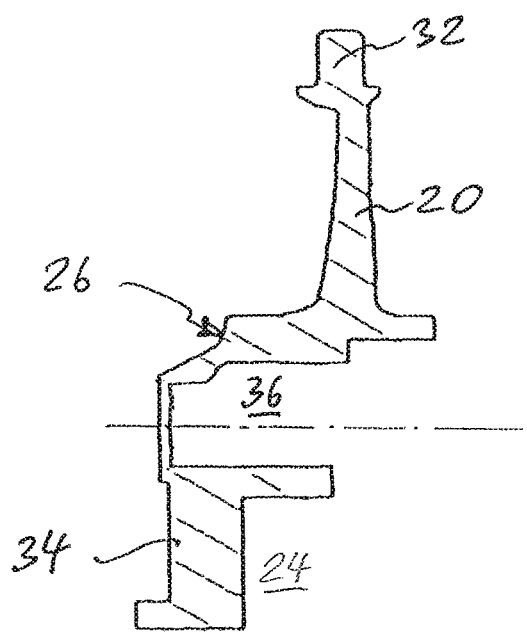
FIG. 12 is a partial sectional front view of a stator assembly taken along the line 5-5 in FIG. 4, without the one-way clutch, the annular actuating piston, the resilient elastic members and a stator hub cover.
Figure 13:
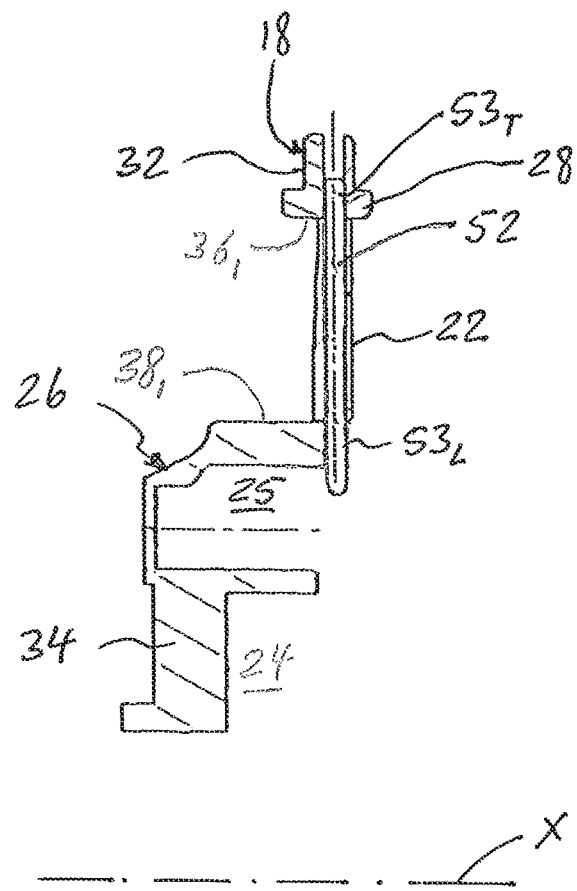
FIG. 13 is a partial sectional front view of the stator assembly taken along the line 6-6 in FIG. 4, without the one-way clutch, the annular actuating piston, the resilient elastic members and the stator hub cover.
Figure 14:
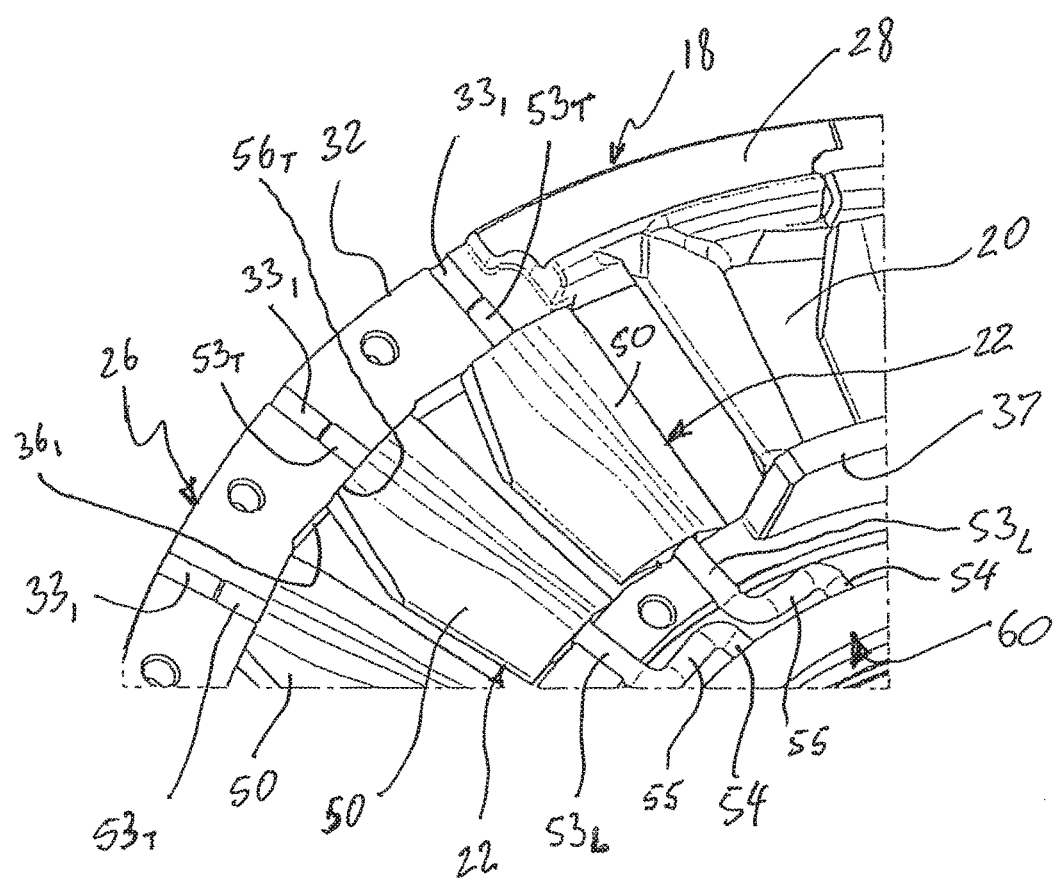
FIG. 14 is an partial perspective view of a section of the stator assembly in accordance with the exemplary embodiment of the present invention.

The stator hub 16 comprises the annular stator hub portion 34 of the stator body 26 and the stator hub cover 30 secured to the outer rim portion 32 by the guide protrusions 37 of the stator body 26 and by the threaded fasteners $31_1$ and $31_2$, such as screws or bolts, as best shown in FIGS. 2, 3A and 3B. Moreover, each of the stator hub portion 34 and the stator hub cover 30 has cooperating radially extending, semi-cylindrical grooves $35_1$ and $35_2$, respectively, forming together radial, cylindrical lower bearing apertures 35 in which the pivot shafts 52 of the rotatable stator blades 22 are journaled. Specifically, radially inner ends $53_L$ of the pivot shafts 52 extend through the stator hub 16 of the stator 12 and engage the lower beating apertures 35 therein, formed by the cooperating radial grooves $35_1$ and $35_2$ in the stator hub portion 34 and the stator hub cover 30, respectively. Each crank pin 54 is connected to the radially inner end $53_L$ of the associated pivot shaft 52 by a crank arm 55, as best shown in FIGS. 8 and 17. According to the exemplary embodiment of the present invention, each crank pin 54 is substantially parallel to the pivot shaft 52, while each crank arm 55 is substantially parallel to both the pivot shaft 52 and the crank pin 54.

Furthermore, the stator hub 16 has a polygonal radially outer surface between the fixed posts 20 of the stator 12. The polygonal radially outer surface of the stator hub 16 includes a plurality of adjacent radially outer planar (i.e., plane or flat) surfaces 38 each facing one of the rotatable stator blades 22. The stator hub portion 34 of the stator body 26 has a plurality of adjacent planar (i.e., plane or flat) radially outer surfaces 38₁ each facing one of the rotatable stator blades 22, while the stator hub cover 30 has a plurality of adjacent and complementary planar (i.e., plane or flat) radially outer surfaces 38₂ each facing one of the rotatable stator blades 22 and cooperating with one of the radially outer planar surfaces 38₁ of the stator hub portion 34 of the stator body 26. In an assembled condition of the stator 12, when the stator hub portion 34 of the stator body 26 and the stator hub cover 30 are axially juxtaposed, each of the axially adjacent pairs of the planar surfaces 38₁ and 38₂ together define one of the planar surfaces 38 of the stator hub 16.

The rotatable blade body 50 of each of the rotatable stator blades 22 has a radially upper planar (i.e., plane or flat) surface 56$_T$, and a radially lower planar (i.e., plane or flat) surface 56$_L$. The radially upper planar surface 56$_T$ of the rotatable blade body 50 of each of the rotatable stator blades 22 faces and slidingly engages one of the radially inner surfaces 36 of the stator belt 18. Similarly, the radially lower planar surface 56$_L$ of the rotatable blade body 50 of each of the rotatable stator blades 22 faces and slidingly engages one of the radially outer surfaces 38 of the stator hub 16. Accordingly, in any of angular positions of the rotatable blade bodies 50 of the rotatable stator blades 22 relative to the stator body 26, an entire area of the radially upper planar surface 56$_T$ of the rotatable blade body 50 of each of the rotatable stator blades 22 slidingly engages one of the radially inner surface 36 of the stator belt 18, while an entire area of the radially lower planar surface 56$_L$ of the rotatable blade body 50 s of each of the rotatable stator blades 22 slidingly engages one of the radially outer surfaces 38 of the stator hub 16.

Figure 6:
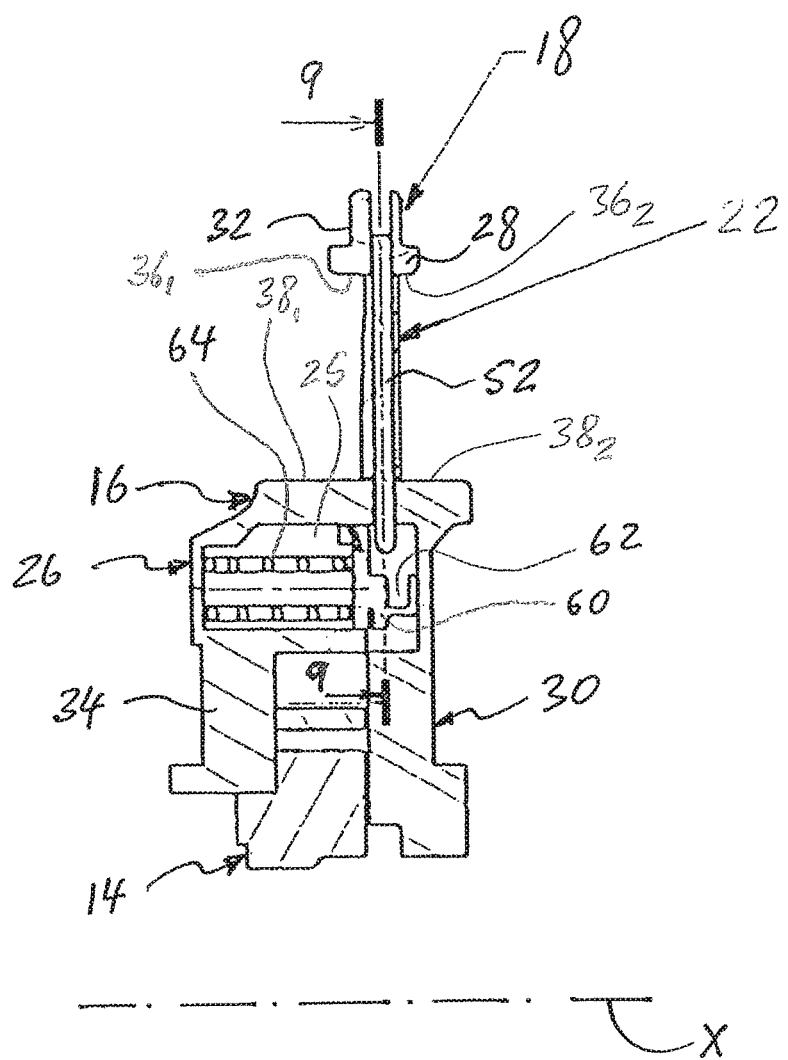
FIG. 6 is a partial sectional front view of the stator assembly taken along the line 6-6 in FIG. 4.
Figure 7:
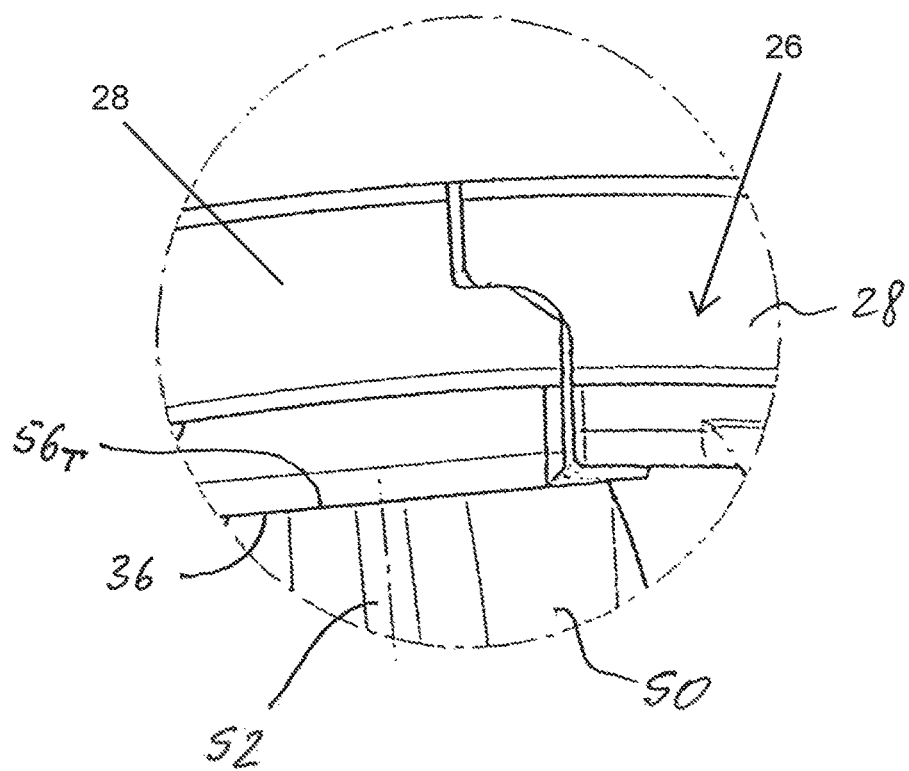
FIG. 7 is an enlarged view of a fragment of the stator assembly shown in the circle "7" in FIG. 4.
Figure 19:
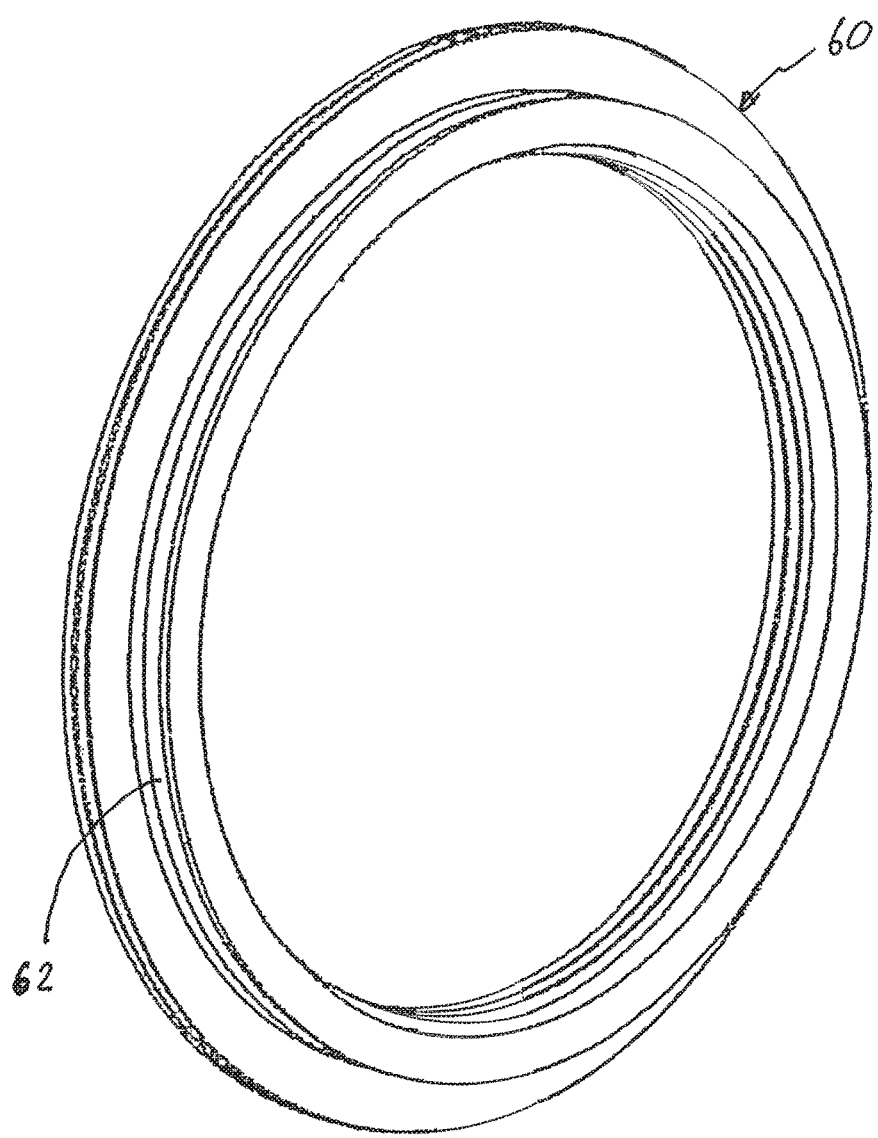
FIG. 19 is a perspective view of the annular actuating piston of the stator assembly in accordance with the exemplary embodiment of the present invention.

The crank pin 54 of each pivot shaft 52 is engaged in an annular groove 62 formed in an annular actuating piston 60, best shown in FIG. 19, coaxially with the rotational axis X. In turn, the actuating piston 60 is axially slidably disposed in the annular actuator bore 25 of the stator hub 16. One or more resilient elastic members 64 are disposed in the actuator bore 25 so as to bias the actuating piston 60 axially in the direction toward the stator hub cover 30. In the exemplary embodiment of the present invention, the resilient elastic members 64 are in the form of coil springs, as best shown in FIGS. 2, 5 and 6. When the actuating piston 60 is moved in an axial direction, the pivot shafts 52 are forced to rotate since the crank pins 54 are positioned in the grooves 62. Since the rotatable stator blades 22 are secured to the pivot shafts 52, the rotatable stator blades 22 are pivoted when the actuating piston 60 is moved in the axial direction. As the rotatable stator blades 22 change angles relative to the rotational axis X, a torque ratio of the torque converter 2 changes.

The actuating piston 60 sealingly divides the actuator bore 25 of the stator hub 16 into a pressure chamber 25$p$ adjacent to the stator hub cover 30, and a spring chamber 25$s$ housing the resilient elastic members 64. In other words, the actuating piston 60 fluidly separates the pressure chamber 25$p$ from the spring chamber 25$s$. The pressure chamber 25$p$ is fluidly connected to a source of hydraulic pressure 3 (best shown in FIG. 11), such as a fluid pump, driven by a vehicle engine for selectively supplying pressurized hydraulic fluid to the pressure chamber 25$p$, as best shown in FIG. 5.

The actuating piston 60 is axially displaced in the actuator bore 25 by the charge pressure of the fluid of the torque converter 2. As the hydraulic charge pressure of the hydraulic fluid in the pressure chamber 25$p$ increases relative to the pressure in the spring chamber 25$s$ (i.e., when the pressure chamber 25$p$ is pressurized), the actuating piston 60 is axially displaced against the biasing force of the resilient elastic members 64 (i.e., axially leftward with respect to the stator hub 16 as shown in FIGS. 5 and 6), causing the rotatable stator blades 22 to pivot in one direction or the other about the axes of the pivot shafts 52 thereof, depending upon the direction of the axial movement of the actuating piston 60. As a result, a torque ratio of the torque converter 2 is changed. When the hydraulic charge pressure of the hydraulic fluid in the pressure chamber 25$p$ is reduced or removed, the actuating piston 60 is axially displaced by the biasing force of the resilient elastic members 64 (to the right as shown in FIG. 5), subsequently causing the rotatable stator blades 22 to pivot in the opposite direction, thus changing the torque ratio of the torque converter 2.

Figure 21A:
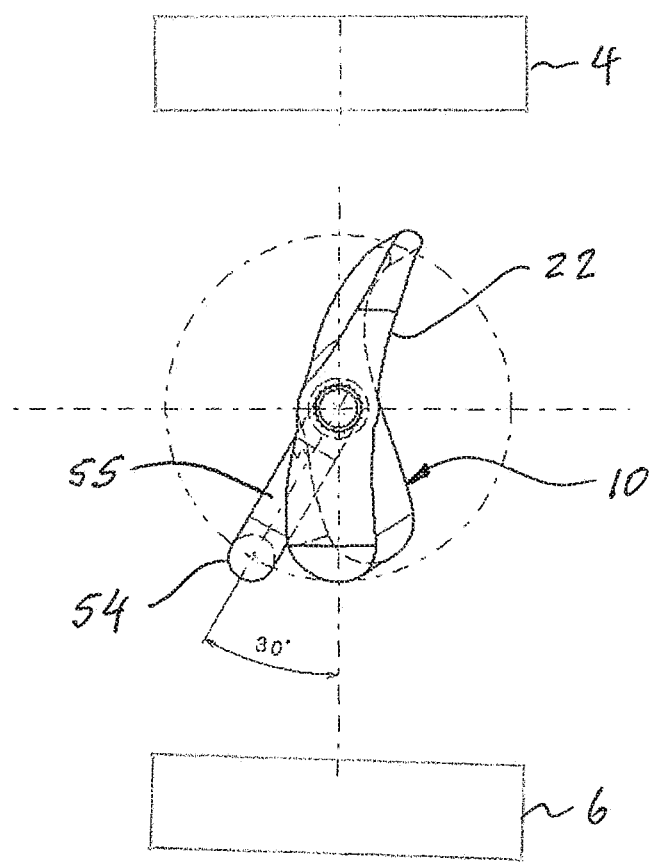
FIG. 21A shows the pivotable stator blades in a fully open position.
Figure 21B:
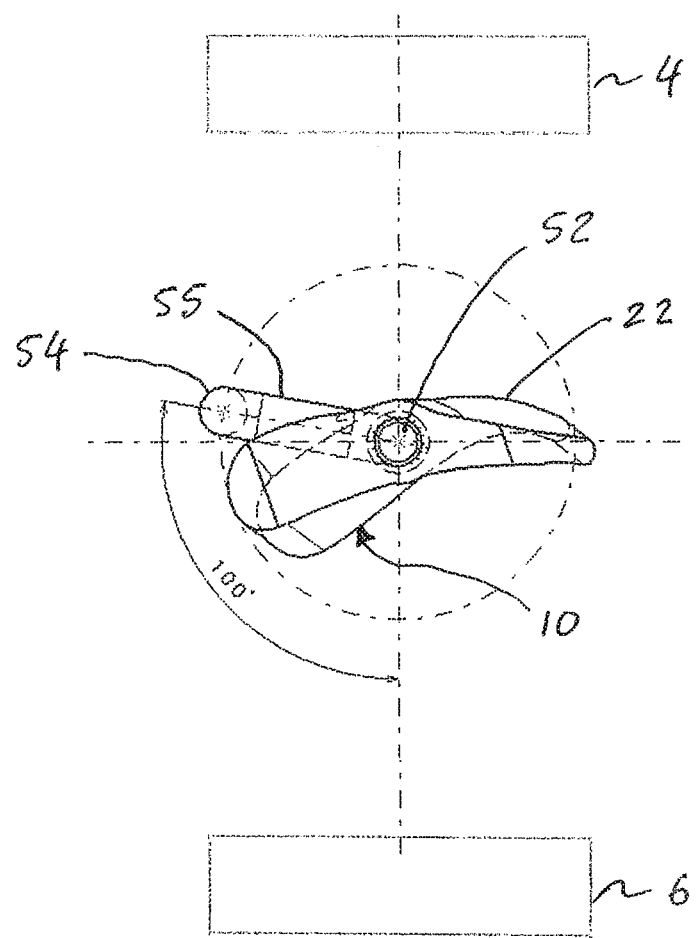
FIG. 21B shows the pivotable stator blades in a closed position.

In other words, the angle of the rotatable stator blades 22 is controlled by varying the axial position of the actuating piston 60 in the actuator bore 25 with respect to the stator hub 16. The one or more resilient elastic members 64 may be installed between the stator hub portion 34 of the stator body 26 and the actuating piston 60 to bias the actuating piston 60 toward the stator hub cover 30. Positions of the rotatable stator blades 22 vary between a closed position, when no pressure is applied to the actuating piston 60 and the coil springs 64 are fully expanded, and an open position when hydraulic pressure is applied to the actuating piston 60 and the coil springs 64 are fully compressed. A pivoting angle range of each of the rotatable stator blades 22 is from 0° (a fully open position), as shown in FIG. 21A, to 80° (a closed position), as shown in FIG. 21B. According to the exemplary embodiment of the present invention, the coil springs 64 bias the rotatable stator blades 22 to the closed position.

Figure 21C:
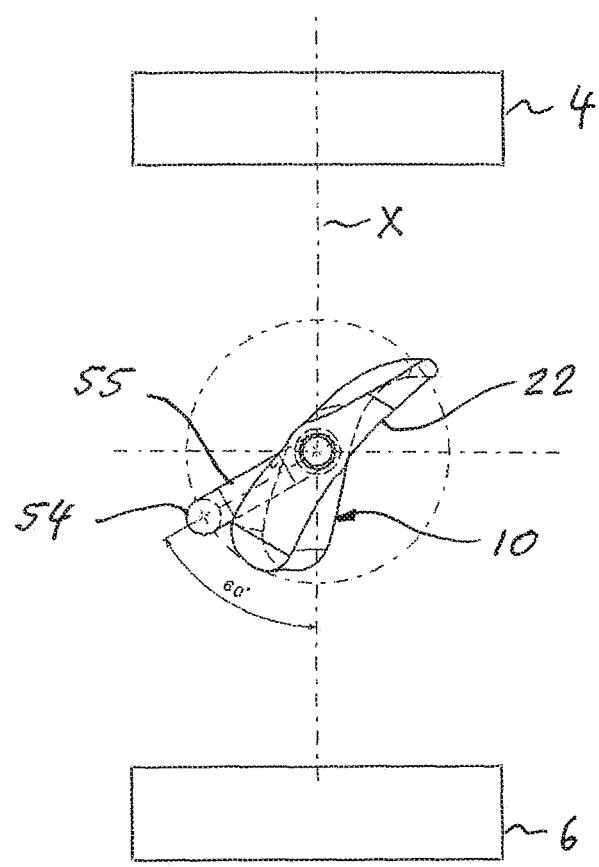
FIG. 21C shows the pivotable stator blades in an intermediate position.

In the fully open position, the crank arm 55 of each of the rotatable stator blades 22 is oriented at an angle of 30° to the rotational axis X, as best shown in FIG. 21A, which corresponds to an angle of 0° of the rotatable stator blades 22 relative to the rotational axis X. In the closed position, the crank arm 55 of each of the rotatable stator blades 22 is oriented at an angle of 100° to the rotational axis X, as shown in FIG. 21B, which corresponds to an angle of 70° of the rotatable stator blades 22 relative to the rotational axis X. In an intermediate position, the crank arm 55 of each of the rotatable stator blades 22 is oriented at an angle of 60° to the rotational axis X, as shown in FIG. 21C, which corresponds to an angle of 30° of the rotatable stator blades 22 relative to the rotational axis X. The fixed stator blades 20 are also oriented at the angle of 30° relative to the rotational axis X.

In operation, when the engine is idling at a stall condition (e.g., when the prime mover is applying power to the impeller wheel, but the turbine wheel cannot rotate; also called a drive mode with brake), the rotatable stator blades 22 are shifted to the closed position so as to generate higher K-factor, which could reduce the drag loss from the torque converter 2. It will be appreciated that the K-factor (KF) is a commonly known in the art engineering term that refers to a ratio of impeller speed $N_1$ to the square root of impeller torque $T_1$). In other words, $KF = N_1/\sqrt{LT_1}$. As the vehicle speeds up (accelerates), the rotatable stator blades 22 are shifted to the fully open position so as to generate lower K-factor. With the lower K-factor it is be easier to engage the lockup clutch 8 earlier that eventually reduces fuel consumption.

Described below is an exemplary method whereby the stator assembly 10 of the hydrokinetic torque converter 2 according to the exemplary embodiment of the present invention is assembled. It should be understood that alternative methods may be practiced within the scope of the invention.

According to the exemplary method, the stator body 26 of the stator 12 is manufactured to form a unitary part (e.g., made of a single part or of separate components fixedly connected together) defining the radially outer rim portion 32, the stator hub portion 34 and the fixed posts 20. Moreover, the outer rim portion 32 and the stator hub portion 34 are formed with the semi-cylindrical grooves $33_1$ and $35_1$, respectively. The stator hub portion 34 of the stator body 26 is formed with the cylindrical central stator hub bore 24 and the annular actuator bore 25 disposed radially outside the central stator hub bore 24. Moreover, the stator body 26 is made integrally with the at least one, preferably three (3) fixed posts 20 each extending radially outwardly between the stator hub 16 and the outer rim 18 and non-movably secured (i.e., fixed) thereto so as to non-moveably mount the outer rim 18 to the stator hub 16.

According to the exemplary embodiment of the present invention, the stator body 26 including the radially outer rim portion 32, the stator hub portion 34 and the at least one fixed post 20 is an integral (or unitary) component, e.g., made of a single part by molding or press-forming, as best shown in FIGS. 2 and 15, but may be separate components fixedly connected together. In other words, the radially outer rim portion 32, the stator hub portion 34 and the at least one fixed post 20 may be separate components fixedly connected to each other so as to form an integral (or unitary) component.

The one-way clutch 14 is mounted to the stator 12 in the central stator hub bore 24 of the stator hub portion 34. The actuating piston 60 and coil springs 64 are inserted axially into the actuator bore 25 of the stator hub portion 34. Then, the rotatable stator blades 22 are mounted to the stator body 26 so that the radially outer ends $53_T$ of the pivot shafts 52 are placed into the semi-cylindrical grooves $33_1$ of the outer rim portion 32, while the radially inner ends $53_L$ of the pivot shafts 52 are placed into the semi-cylindrical grooves $35_1$ of the stator hub portion 34 of the stator body 26. At the same time, the crank pin 54 of the pivot shaft 52 is inserted into the annular groove 62 in the actuating piston 60.

Next, the outer rim parts 28 of the stator 12 are non-moveably secured to the outer rim portion 32 of the stator body 26 by the fasteners 29 so as to sandwich the radially outer ends $53_T$ of the pivot shafts 52 between the outer rim portion 32 of the stator body 26 and the outer rim parts 28, and the stator hub cover 30 is non-moveably secured to the stator hub portion 34 of the stator body 26 by the fasteners $31_1$ and $31_2$ so as to sandwich the radially inner ends $53_L$ of the pivot shafts 52 between the stator hub portion 34 of the stator body 26 and the stator hub cover 30. Thus, the radially outer ends $53_T$ of the pivot shafts 52 are placed into the upper bearing apertures 33, while the radially inner ends $53_L$ of the pivot shafts 52 are placed into the lower bearing apertures 35.

Then, the stator assembly 10 is slidingly mounted to the stationary stator shaft 9 so that the splines 45 of the inner ring 42 of the one-way clutch 14 non-rotatably engage splines of the stationary stator shaft 9 of the hydrokinetic torque converter 2.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A stator assembly of a hydrokinetic torque converter, the stator assembly comprising a stator rotatable about a rotational axis, the stator comprising:
    a radially outer stator belt;
    an annular stator hub disposed radially within the radially outer stator belt;
    at least one fixed post extending radially outwardly between the stator hub and the stator belt, the at least one fixed post fixed to the stator hub and the stator belt so as to non-moveably secure the stator belt to the stator hub; and
    a plurality of pivotable stator blades extending radially outwardly between the stator hub and the stator belt and configured to pivot relative to both the stator hub and the stator belt;
    the radially outer stator belt including a radially outer rim portion integral with the at least one fixed post and at least one outer rim part non-moveably secured to the outer rim portion;
    each of the pivotable stator blades including a pivot shaft rotatably mounted between the outer rim portion and the at least one outer rim part.

2. The stator assembly as defined in claim 1, wherein the at least one fixed post of the stator is a fixed stator blade.

3. The stator assembly as defined in claim 1, wherein each of the pivotable stator blades has a planar radially outer surface and a planar radially inner surface; and wherein the radially outer stator belt, the annular stator hub and the at least one fixed post define a unitary stator member having a plurality of planar radially outer surfaces each adjacent and facing the planar radially inner surface of one of the pivotable stator blades, and a plurality of planar radially inner surfaces each adjacent and facing the planar radially outer surface of one of the pivotable stator blades.

4. The stator assembly as defined in claim 1, wherein each of the pivotable stator blades has a planar radially outer surface, and wherein the radially outer stator belt has a plurality of planar radially inner surfaces each adjacent and facing the planar radially outer surface of one of the pivotable stator blades.

5. The stator assembly as defined in claim 1, wherein each of the pivotable stator blades has a planar radially inner surface, and wherein the annular stator hub has a plurality of planar radially outer surfaces each adjacent and facing the planar radially inner surface of one of the pivotable stator blades.

6. The stator assembly as defined in claim 1, wherein each of the pivotable stator blades includes a rotatable blade body non-rotatably secured to a pivot shaft rotatably supported by the stator hub and the stator belt of the stator.

7. The stator assembly as defined in claim 6, wherein the pivot shaft of each of the pivotable stator blades has a crank pin at a radially inner end of the pivot shaft.

8. The stator assembly as defined in claim 7, wherein the annular stator hub defines an annular actuator bore coaxial to the rotational axis.

9. The stator assembly as defined in claim 8, further comprising an actuating piston axially slidably disposed in the actuator bore of the stator hub, and at least one resilient spring member disposed in the actuator bore so as to bias the actuating piston axially.

10. The stator assembly as defined in claim 9, wherein the crank pin of the pivot shaft of each of the pivotable stator blades is engaged in a groove formed in the actuating piston so that axial movement of the actuating piston in the actuator bore causes pivotal movement of each of the pivotable stator blades.

11. The stator assembly as defined in claim 1, wherein the stator hub includes an annular stator hub portion integral with the at least one fixed post and a stator hub cover non-moveably secured to the stator hub portion; and wherein each of the pivotable stator blades includes a pivot shaft rotatably mounted between the stator hub portion and the stator hub cover.

12. The stator assembly as defined in claim 1, wherein the annular stator hub defines a central stator hub bore coaxial to the rotational axis, and wherein the stator assembly further comprises a one-way clutch mounted to the stator in the central stator hub bore coaxially to the rotational axis.

13. A hydrokinetic torque converter, comprising:
an impeller wheel rotatable about a rotational axis;
a turbine wheel coaxially aligned with and hydrodynamically drivable by the impeller wheel; and
a stator assembly situated between the impeller wheel and the turbine wheel, the stator assembly comprising a stator rotatable about the rotational axis, the stator comprising:
a radially outer stator belt;
an annular stator hub disposed radially within the radially outer stator belt;
at least one fixed post extending radially outwardly between the stator hub and the stator belt, the at least one fixed post fixed to the stator hub and the stator belt so as to non-moveably secure the stator belt to the stator hub; and
a plurality of pivotable stator blades extending radially outwardly between the stator hub and the stator belt and configured to pivot relative to both the stator hub and the stator belt;
the radially outer stator belt including a radially outer rim portion integral with the at least one fixed post and at least one outer rim part non-moveably secured to the outer rim portion;
each of the pivotable stator blades including a pivot shaft rotatably mounted between the outer rim portion and the at least one outer rim part.

14. The stator assembly as defined in claim 13, wherein the at least one fixed post of the stator is a fixed stator blade.

15. The stator assembly as defined in claim 13, wherein each of the pivotable stator blades has a planar radially outer surface and a planar radially inner surface; and wherein the radially outer stator belt, the annular stator hub and the at least one fixed post define a unitary stator member having a plurality of planar radially outer surfaces each adjacent and facing the planar radially inner surface of one of the pivotable stator blades, and a plurality of planar radially inner surfaces each adjacent and facing the planar radially outer surface of one of the pivotable stator blades.

16. The stator assembly as defined in claim 13, wherein the stator hub includes an annular stator hub portion integral with the at least one fixed post and a stator hub cover non-moveably secured to the stator hub portion; and wherein each of the pivotable stator blades includes a pivot shaft rotatably mounted between the stator hub portion and the stator hub cover.

17. The stator assembly as defined in claim 13, wherein the annular stator hub defines a central stator hub bore coaxial to the rotational axis, and wherein the stator assembly further comprises a one-way clutch mounted to the stator in the central stator hub bore coaxially to the rotational axis.

18. A method for making a stator assembly of a hydrokinetic torque converter, the method comprising the steps of:
manufacturing a stator member including an annular stator hub, a radially outer stator belt, and at least one fixed post extending radially outwardly between the stator hub and the stator belt, the at least one fixed post being integral with the stator hub or the stator belt so as to non-moveably secure the stator belt to the stator hub, the radially outer stator belt including a radially outer rim portion integral with the at least one fixed post and at least one outer rim part;
providing a plurality of pivotable stator blades, each of the pivotable stator blades including a pivot shaft; and
rotatably mounting the pivotable stator blades to the stator member between the outer rim portion and the at least one outer rim part and non-moveably securing the at least one outer rim part to the outer rim portion.

* * * * *